J. D. HARRIS & K. A. ACZÉL.
LAMP.
APPLICATION FILED OCT. 11, 1909.
1,003,738.
Patented Sept. 19, 1911.
2 SHEETS—SHEET 1.
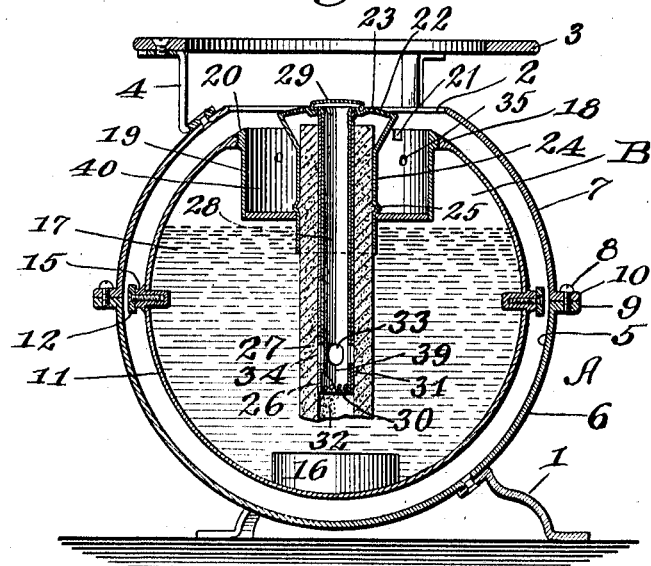
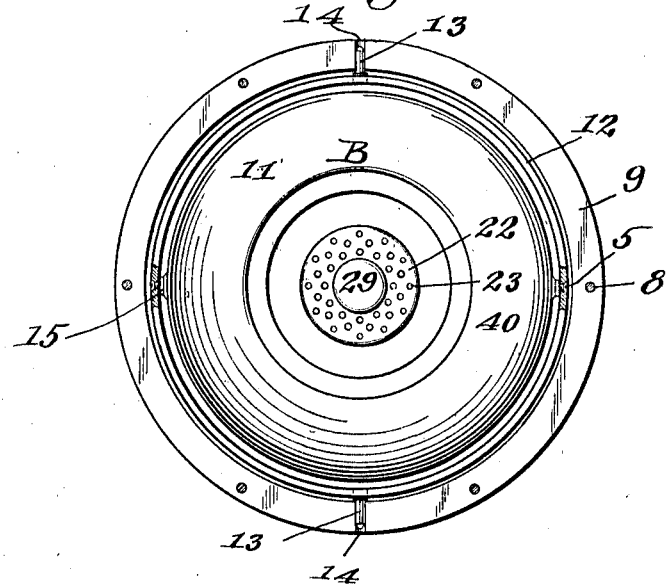
WITNESSES:
INVENTORS
Karl A. Aczél
J. D. Harris
BY Leonard Day
ATTORNEY

J. D. HARRIS & K. A. ACZÉL.
LAMP.
APPLICATION FILED OCT. 11, 1909.

1,003,738.

Patented Sept. 19, 1911.

2 SHEETS—SHEET 2.

WITNESSES:
H. Crocheron
George Pütschen

INVENTORS
Karl A. Aczél
J. D. Harris
BY Leonard Day
ATTORNEY

COLUMBIA PLANOGRAPH CO., WASHINGTON, D. C.

UNITED STATES PATENT OFFICE.

JOHN D. HARRIS, OF LIVERPOOL, ENGLAND, AND KARL A. ACZÉL, OF KEMENCZE, AUSTRIA-HUNGARY.

LAMP.

1,003,738.      Specification of Letters Patent.      Patented Sept. 19, 1911.

Application filed October 11, 1909. Serial No. 522,097.

*To all whom it may concern:*

Be it known that we, JOHN D. HARRIS, a subject of the King of Great Britain, and a resident of Liverpool, England, and KARL A. ACZÉL, a subject of the King of Hungary, and a resident of Kemencze, county of Hout, Austria-Hungary, have invented certain new and useful Improvements in Lamps, as set forth in the following specification.

This invention relates in general to lamps and more particularly to those of the vapor burner class employed for heating purposes.

It is an object of the invention to provide a readily portable lamp structure which, on over-turning, will be self-extinguishing and incapable of spilling its charge of combustible liquid.

A further object of the invention is to provide for the ready manipulation of the lamp to generate an initial supply of combustible vapor in the burner.

In addition to the above objects it is the general object of the invention to improve the mechanical structure of and arrangement of parts in a lamp of the type described.

The above and further objects of the invention will be pointed out more in detail in the following claims and will be clear from the following specification which should be read in connection with the accompanying drawings, forming part of this application, in which like characters designate corresponding parts, and in which,—

Figure 3:
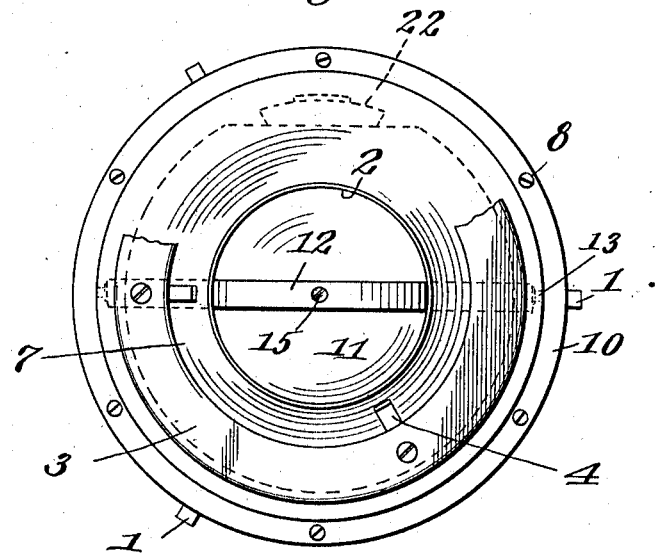
Figure 4:
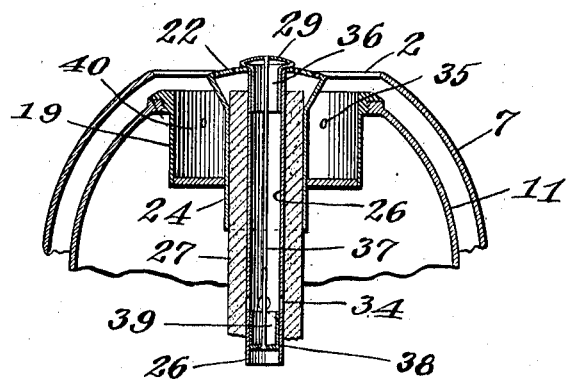

Figure 1 is a vertical section through the completed structure; Fig. 2 is a plan view of the same with the top hemispherical casing removed and showing parts in horizontal section; Fig. 3 is a side elevation with parts broken away looking toward the left of Fig. 1 and with the outer casing turned over counter-clockwise 90°; and Fig. 4 is a fragmentary vertical section corresponding to Fig. 1 but showing a modification.

The lamp comprises an outer casing A suitably supported, as by the legs 1, in an upright position and providing a flame opening 2, shown circular in the drawings, in its upper portion. There is also provided above the opening 2 a suitable support 3 for an article to be heated. This support may itself be supported in any suitable manner and is shown secured to the casing A by means of the legs 4. The casing A may be of any desired exterior contour but is shown providing an interior spherical cavity within its inner spherical surface 5. The casing may be divided for convenience along its equator into substantially hemispherical lower and upper shells 6 and 7 suitably secured together by any securing means such as the screws 8 engaging their out-turned flanges 9 and 10.

Suspended within the spherical cavity of casing A is a combined tank and burner structure B. This structure B comprises a substantially spherical tank 11 concentrically supported by the casing A. The supporting means is shown comprising a gimbal ring 12 pivoted by means of the pivot pins 13 in suitable bearings 14 formed in the flanges 9 and 10 at the ends of a horizontal diameter of the outer casing. Trunnions or pivot pins 15 are suitably secured to or formed on the tank 11 at points corresponding to the ends of a horizontal diameter of this tank 11. These pins are pivoted to the gimbal ring 12 at points intermediate pivot pins 13 and consequently in a line at right angles to the line of the pivot pins 13. This gimbal means therefore provides for the theoretical suspension of the lamp and burner structure B at its geometric center and permits its free universal movement about the concentric center of this structure B and the outer casing A. To maintain the burner and tank structure always in an upright position its center of gravity is lowered below its geometric center by means of a weight 16 shown secured within the tank 11 in the lowermost portion thereof.

The tank 11 is designed to contain a charge of combustible medium 17, such as alcohol, and is provided in its upper portion with a circular opening formed by the threaded flange 18 adapted to be engaged by the downwardly projecting burner pan 19, which is likewise provided with a threaded flange 20 to engage the flange 18 and may have cotter slots 21 for the engagement of a key to effect its insertion and removal.

The lamp burner proper comprises a flaring head 22 providing vapor openings 23 and is shown formed as a continuation of a tubular member 24 concentrically seated within the burner pan 19 upon its bits 25 and downwardly projecting a suitable distance into the tank 11.

Axially positioned within the member 24 and secured at its upper end about the lips of a suitable central opening in the burner 22 is a downwardly projecting inner tube 26. Located between this inner tube 26 and the tubular member 24 is shown a cylindrical wick 27, it being obvious that the inner tube 26 is means for providing a passage through the burner and wick down to the fluid in tank 11, although this passage might be provided in any suitable manner by any suitable means or provisions.

Normally located within the inner tube 26 is a removable tubular carrier 28 provided at its top with a flanged cross closure 29 completely covering the central opening in the burner 22. This tubular carrier 28, telescoping with the inner tube 26, is provided with a cross closure 30 at its lower end and with a series of marginal perforations 31 corresponding to similar marginal perforations 32 provided in juxtaposition in the lower end of inner tube 26. These perforations, particularly those in the carrier 28 should be small enough to retard the flow therethrough of the combustible fluid 17. At a slight elevation above the perforations 31 and 32 corresponding series of larger perforations 33 and 34 are provided respectively in the walls of the carrier 28 and the inner tube 26 so as to aline or overlap each other with the parts as shown in Fig. 1.

It is to be understood that suitable vents may be provided in the structure, as for example, the vents 35 illustrated.

In Fig. 4 the removable carrier is illustrated in modified form the modification construction being a thimble-like plug 26 having a cross closure 29 and suspended from it by means of a suitable rod 37 an upwardly opening carrier 38 terminating just below the openings 34 of the inner tube 26. In both constructions the removable carrier construction provides a chamber 39 within which combustible fluid may collect and be removed from the tank 11 upon the removal of the carrier construction.

To start the lamp the removable carrier is withdrawn and its charge of combustible liquid discharged into the trough 40 provided by the burner pan 19 beneath and about the burner 22. With the structure shown in Fig. 1 the telescopic relations of the tubular carrier 28 with the inner tube 26 closes the lower perforations 31 sufficiently during the removal of the carrier to prevent the escape of the combustible liquid within the chamber 39 until it has been entirely removed, whereupon its charge of liquid is readily discharged into the trough 40. In connection with the modification shown in Fig. 4 the receptacle 38 is emptied of its charge of liquid in an obvious manner into the trough 40. The removable carrier should then be replaced, whereupon the liquid in the trough 40 may be lighted to heat up the tube 24 and burner 22 to generate the initial supply of vapor for burner 22 which ignites upon emission from the openings 23 and provides sufficient heat to maintain a continuous supply of vapor for the burner, from the liquid delivered by the wick.

Should the lamp be overturned by accident or otherwise the tank and burner structure maintains its upright position while the outer casing A moves relatively thereto to envelop the burner 22 and smother the flame. Fig. 3 clearly illustrates the relative positions of the parts upon the overturning of the lamp. Obviously the lamp may be conveniently extinguished by purposely overturning the same.

The drawings indicate clearly that the combined burner and tank structure B is so designed that all the parts thereof terminate substantially flush with a sphere of the minimum diameter which can inclose tank 11. This arrangement is desirable to economize space and to insure the free universal movement of the structure B within the casing A, which, of course, necessitates that no projecting part of the structure B shall be engageable by the gimbal ring 12.

In the construction of the lamp any suitable material may be employed, it having been found that both sheet and cast metal are satisfactory.

A satisfactory embodiment of the invention having been illustrated and described for purposes of illustration, it is to be understood that all modifications within the scope of the accompanying claims are contemplated.

What is claimed and what is desired to be secured by United States Letters Patent is:—

1. A lamp comprising, a casing providing a restricted flame opening in its upper portion and an inner spherical cavity; a substantially spherical tank for combustible liquid substantially filling said spherical cavity; a burner pan provided beneath said burner to generate the initial supply of combustible vapor in said burner; a removable carrier downwardly projecting through an opening provided in said tank, outwardly terminating within the spherical confines of the said tank, and for conveying a charge of combustible fluid from said tank to said burner pan; means for providing universal relative movement and supporting said tank, burner, pan and carrier within said casing; and a weight for maintaining said tank and burner always in upright position.

2. In a lamp a vapor burner in combination with a tank for vaporizable combustible fluid; a wick for supplying said burner with said fluid; a burner trough encircling said vapor burner to generate an initial supply of vapor in said burner; means for providing a passage through said burner and wick to the fluid in said tank; a removable carrier downwardly projecting through said passage, normally closing the same and operable upon removal to convey a charge of said fluid to said burner trough.

In witness whereof, we have signed our names to this specification, in the presence of two subscribing witnesses.

JOHN D. HARRIS.
KARL A. ACZÉL.

Witnesses:
H. E. GIFFORD, JR.,
L. ALTMAN.

Copies of this patent may be obtained for five cents each, by addressing the "Commissioner of Patents, Washington, D. C."